(12) United States Patent
Patel et al.

(10) Patent No.: US 11,788,608 B2
(45) Date of Patent: Oct. 17, 2023

(54) MULTI-SPEED PLANETARY TRANSMISSION

(71) Applicant: Allison Transmission, Inc., Indianapolis, IN (US)

(72) Inventors: Nayan Patel, Avon, IN (US); Jorge F. Briceno, Brownsburg, IN (US); Conrad Rockey, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 17/802,207

(22) PCT Filed: Feb. 18, 2021

(86) PCT No.: PCT/US2021/018512
§ 371 (c)(1),
(2) Date: Aug. 25, 2022

(87) PCT Pub. No.: WO2021/173415
PCT Pub. Date: Sep. 2, 2021

(65) Prior Publication Data
US 2023/0117356 A1    Apr. 20, 2023

Related U.S. Application Data

(60) Provisional application No. 62/981,436, filed on Feb. 25, 2020.

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
CPC .............. F16H 3/66; F16H 2200/0069; F16H 2200/2012; F16H 2200/2048
(Continued)

(56) References Cited

U.S. PATENT DOCUMENTS

| 4,589,294 A | 5/1986 | Keenan et al. |
| 4,742,733 A | 5/1988 | Schreiner |

(Continued)

FOREIGN PATENT DOCUMENTS

SU    1379524 A1 *  3/1988

OTHER PUBLICATIONS

English translation of SU1379524A1; http://translationportal.epo.org; Feb. 27, 2023 (Year: 2023).*

(Continued)

*Primary Examiner* — Roger L Pang
(74) *Attorney, Agent, or Firm* — Faegre Drinker Biddle & Reath LLP

(57) ABSTRACT

A multi-speed transmission including a plurality of planetary gearsets and a plurality of selective couplers to achieve at least ten forward speed ratios is disclosed. The plurality of planetary gearsets may include a first planetary gearset, a second planetary gearset, a third planetary gearset, and a fourth planetary gearset. The plurality of selective couplers may include a number of clutches and a number of brakes. The multi-speed transmission may have four planetary gearsets and seven selective couplers. The seven selective couplers may include three clutches and four brakes.

27 Claims, 2 Drawing Sheets

(58) Field of Classification Search
USPC .................................................. 475/271, 290
See application file for complete search history.

(56) References Cited

U.S. PATENT DOCUMENTS

| | | | |
|---|---|---|---|
| 4,748,869 A | 6/1988 | Ohtsuka | |
| 4,777,837 A | 10/1988 | Lehle | |
| 4,873,880 A | 10/1989 | Amedei et al. | |
| 5,063,793 A | 11/1991 | McAskill | |
| 6,190,280 B1 | 2/2001 | Horsch | |
| 6,620,070 B2 | 9/2003 | Nerstad et al. | |
| 7,217,211 B2 | 5/2007 | Klemen et al. | |
| 8,388,488 B2 | 3/2013 | Phillips et al. | |
| 8,398,524 B2 | 3/2013 | Kraynev et al. | |
| 8,425,367 B2 | 4/2013 | Phillips et al. | |
| 8,506,443 B2 | 8/2013 | Seo et al. | |
| 8,562,486 B1 * | 10/2013 | Eber | F16H 3/66 |
| 8,651,996 B2 | 2/2014 | Mellet et al. | |
| 8,715,128 B2 | 5/2014 | Kempf et al. | |
| 8,777,797 B2 | 7/2014 | Mellet et al. | |
| 8,795,128 B2 | 8/2014 | Mellet et al. | |
| 8,827,862 B2 | 9/2014 | Koch et al. | |
| 9,518,639 B2 | 12/2016 | Lee et al. | |
| 9,523,412 B2 | 12/2016 | Lee et al. | |
| 9,625,007 B2 | 4/2017 | Long et al. | |
| 9,657,815 B2 | 5/2017 | Lee et al. | |
| 9,784,339 B2 | 10/2017 | Park et al. | |
| 9,816,590 B2 | 11/2017 | Lee et al. | |
| 9,879,761 B2 | 1/2018 | Vu | |
| 9,890,833 B2 | 2/2018 | Lee et al. | |
| 10,047,832 B2 | 8/2018 | Kim et al. | |
| 10,221,922 B2 | 3/2019 | Haupt et al. | |
| 10,295,031 B2 | 5/2019 | Lee et al. | |
| 10,302,175 B2 | 5/2019 | Kwon et al. | |
| 10,352,403 B2 | 7/2019 | Beck et al. | |
| 10,428,909 B2 | 10/2019 | Beck et al. | |
| 10,436,289 B2 | 10/2019 | Kim | |
| 10,465,778 B2 | 11/2019 | Kwon et al. | |
| 10,487,920 B2 | 11/2019 | Hwang et al. | |
| 10,544,853 B2 | 1/2020 | Kim et al. | |
| 2010/0257952 A1 | 10/2010 | Rieger et al. | |
| 2013/0225357 A1 | 8/2013 | Etchason | |
| 2013/0324350 A1 | 12/2013 | Meyer et al. | |
| 2017/0167577 A1 * | 6/2017 | Hwang | F16H 3/66 |
| 2018/0073609 A1 | 3/2018 | Yoshino et al. | |
| 2019/0120333 A1 | 4/2019 | Seongwook et al. | |

OTHER PUBLICATIONS

Eaton Fuller Heavy-Duty Transmissions TRDR0800 EN-US; Driver Instructions; Jun. 2014.
Apakidze, Timur; Saturation Dive: Ford 10 Speed Transmission Power Flow; TTAC; Dec. 23, 2014.
GM; Holy Shift! A Look inside GM's new 10-Speed Automatic; May 11, 2016.
Sherman, Don; Honda's Revived Inventiveness Delivers New 10-Speed Automatic; Mar. 10, 2017.
Mercedes-Benz Unimog U4000 First Drive; The Actual Ultimate Driving Machine: Are Life-Changing Experiences Supposed to be This Much Fun?
U S. Patent and Trademark Office; International Search Report and Written Opinion; International Application No. PCT/US21/18512; dated Apr. 20, 2021.

* cited by examiner

| Gear | 162 | 164 | 166 | 168 | 170 | 172 | 174 |
|------|-----|-----|-----|-----|-----|-----|-----|
| Rev  |     |     | X   |     | X   | X   |     |
| N    |     |     |     |     |     |     |     |
| 1st  | X   |     |     | X   |     |     | X   |
| 2nd  | X   |     | X   |     |     |     | X   |
| 3rd  | X   | X   |     |     |     |     | X   |
| 4th  |     | X   | X   |     |     |     | X   |
| 5th  |     | X   |     | X   |     |     | X   |
| 6th  | X   |     | X   | X   |     |     |     |
| 7th  | X   |     |     |     |     | X   |     |
| 8th  | X   | X   |     |     |     | X   |     |
| 9th  |     | X   | X   |     |     | X   |     |
| 10th |     | X   |     | X   |     | X   |     |

"X" = ENGAGED CONFIGURATION
"BLANK" = DISENGAGED CONFIGURATION

FIG. 2

MULTI-SPEED PLANETARY TRANSMISSION

RELATED APPLICATION

This application is a national stage application of PCT Application No. PCT/US2021/018512, filed Feb. 18, 20211, which claims the benefit of U.S. Provisional Patent Application Ser. No. 62/981,436, filed Feb. 25, 2020, titled MULTI-SPEED PLANETARY TRANSMISSION, the entire disclosures of which are expressly incorporated by reference herein.

FIELD OF THE DISCLOSURE

The present disclosure relates to a multi-speed transmission and in particular to a multi-speed transmission including a plurality of planetary gearsets and a plurality of selective couplers to achieve at least ten forward speed ratios and at least one reverse speed ratio.

BACKGROUND OF THE DISCLOSURE

Multi-speed transmissions use a plurality of planetary gearsets, selective couplers, interconnectors, and additional elements to achieve a plurality of forward and reverse speed ratios. Exemplary multi-speed transmissions are disclosed in U.S. Pat. No. 9,625,007, Ser. No. 14/457,592, titled MULTI-SPEED TRANSMISSION, filed Aug. 12, 2014, the entire disclosure of which is expressly incorporated by reference herein.

SUMMARY

The present disclosure provides a multi-speed transmission including a plurality of planetary gearsets and a plurality of selective couplers to achieve at least ten forward speed ratios wherein the output member rotates in the same direction as the input member and one reverse speed ratio wherein the output member rotates in the opposite direction as the input member. The plurality of planetary gearsets may include a first planetary gearset, a second planetary gearset, a third planetary gearset, and a fourth planetary gearset. The plurality of selective couplers may include a number of clutches and a number of brakes. In one example, the present disclosure provides a multi-speed transmission having four planetary gearsets and seven selective couplers. The seven selective couplers may include three clutches and four brakes.

In some instances throughout this disclosure and in the claims, numeric terminology, such as first, second, third, and fourth, is used in reference to various gearsets, gears, gearset components, interconnectors, selective couplers, and other components. Such use is not intended to denote an ordering of the components. Rather, numeric terminology is used to assist the reader in identifying the component being referenced and should not be narrowly interpreted as providing a specific order of components. For example, a first planetary gearset identified in the drawings may support any one of the plurality of planetary gearsets recited in the claims, including the first planetary gearset, the second planetary gearset, the third planetary gearset, and the fourth planetary gearset, depending on the language of the claims.

In an exemplary embodiment of the present disclosure, a transmission is provided. The transmission comprising: at least one stationary member; an input member rotatable relative to the at least one stationary member; a plurality of planetary gearsets operatively coupled to the input member; an output member operatively coupled to the input member through the plurality of planetary gearsets and rotatable relative to the at least one stationary member; and a plurality of selective couplers including a first number of clutches and a second number of brakes. Each of the plurality of planetary gearsets including a first gearset component, a second gearset component, and a third gearset component, the plurality of planetary gearsets including a first planetary gearset, a second planetary gearset, a third planetary gearset, and a fourth planetary gearset. The output member is fixedly coupled to the fourth planetary gearset. The input member is: (i) fixedly coupled to the first planetary gearset; (ii) selectively coupled through a first clutch of the plurality of selective couplers, when engaged, to both the second planetary gearset and the third planetary gearset; and (iii) selectively coupled through a second clutch of the plurality of selective couplers, when engaged, to both the second planetary gearset and the third planetary gearset independent of the first clutch.

In an example thereof, the first clutch, when engaged, couples the input member to the first gearset component of the second planetary gearset and to the first gearset component of the third planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear. In another variation thereof, the second clutch, when engaged, couples the input member to the second gearset component of the second planetary gearset and to the third gearset component of the third planetary gearset. In a further variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

In another example thereof, the second clutch, when engaged, couples the input member to the second gearset component of the second planetary gearset and to the third gearset component of the third planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

In a further example thereof, the second number is greater than the first number. In a variation thereof, the second number is four and the first number is three.

In yet another example thereof, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear, wherein a first brake of the plurality of selective couplers, when engaged, fixedly couples the first ring gear of the first planetary gearset to the at least one stationary member; a second brake of the plurality of selective couplers, when engaged, fixedly couples the second ring gear of the second planetary gearset to the at least one stationary member; a third brake of the plurality of selective couplers, when engaged, fixedly couples the third ring gear of the third planetary gearset to the at least one stationary member; and a fourth brake of the plurality of selective couplers, when engaged, fixedly couples the fourth ring gear of the fourth planetary gearset to the at least one stationary member.

In still another example thereof, the input member is fixedly coupled to the first gearset component of the first planetary gearset. In a variation thereof, the output member is fixedly coupled to the second gearset component of the fourth planetary gearset.

In yet a further example thereof, the transmission further comprising a first interconnector which fixedly couples the second gearset component of the first planetary gearset and the third gearset component of the second planetary gearset together; a second interconnector fixedly couples the second gearset component of the second planetary gearset and the third gearset component of the third planetary gearset together; a third interconnector which fixedly couples the first gearset component of the second planetary gearset and the first gearset component of the third planetary gearset together; and a fourth interconnector which fixedly couples the second gearset component of the third planetary gearset and the first gearset component of the fourth planetary gearset together. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

In still a further example thereof, the plurality of selective couplers includes: a first selective coupler which, when engaged, fixedly couples the first gearset component of the first planetary gearset to the first gearset component of the second planetary gearset and the first gearset component of the third planetary gearset; a second selective coupler which, when engaged, fixedly couples the first gearset component of the first planetary gearset to the second gearset component of the second planetary gearset and the third gearset component of the third planetary gearset; a third selective coupler which, when engaged, fixedly couples the third gearset component of the first planetary gearset to the at least one stationary member; a fourth selective coupler which, when engaged, fixedly couples the third gearset component of the second planetary gearset to the at least one stationary member; a fifth selective coupler which, when engaged, fixedly couples the third gearset component of the third planetary gearset to the at least one stationary member; a sixth selective coupler which, when engaged, fixedly couples the second gearset component of the third planetary gearset and the first gearset component of the fourth planetary gearset to the second gearset component of the fourth planetary gearset; and a seventh selective coupler which, when engaged, fixedly couples the third gearset component of the fourth planetary gearset to the at least one stationary member. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

In a further still example thereof, each of the first planetary gearset, the second planetary gearset, the third planetary gearset, and the fourth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

In yet a further still example thereof, the at least one stationary member includes a housing, the housing having a first end and a second end, wherein the input member is accessible proximate the first end of the housing; the output member is accessible proximate the second end of the housing; the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the second end of the housing.

In another still further example thereof, the plurality of selective couplers are selectively engaged in a plurality of combinations to establish at least ten forward speed ratios and at least one reverse speed ratio between the input member and the output member, each of the plurality of combinations having at least three of the plurality of selective couplers engaged.

According to another exemplary embodiment of the present disclosure, a transmission is provided. The transmission comprising at least one stationary member; an input member rotatable relative to the at least one stationary member; a plurality of planetary gearsets operatively coupled to the input member; an output member operatively coupled to the input member through the plurality of planetary gearsets and rotatable relative to the at least one stationary member; a first interconnector, a second interconnector, a third interconnector, a fourth interconnector, and a plurality of selective couplers. Each of the plurality of planetary gearsets includes a first gearset component, a second gearset component, and a third gearset component. The plurality of planetary gearsets includes a first planetary gearset, a second planetary gearset, a third planetary gearset, and a fourth planetary gearset. The input member is fixedly coupled to the first gearset component of the first planetary gearset. The output member is fixedly coupled to the second gearset component of the fourth planetary gearset. The first interconnector fixedly couples the second gearset component of the first planetary gearset and the third gearset component of the second planetary gearset together. The second interconnector fixedly couples the second gearset component of the second planetary gearset and the third gearset component of the third planetary gearset together. The third interconnector fixedly couples the first gearset component of the second planetary gearset and the first gearset component of the third planetary gearset together. The fourth interconnector fixedly couples the second gearset component of the third planetary gearset and the first gearset component of the fourth planetary gearset together. The plurality of selective couplers includes: a first selective coupler which, when engaged, fixedly couples the first gearset component of the first planetary gearset to the first gearset component of the second planetary gearset and the first gearset component of the third planetary gearset; a second selective coupler which, when engaged, fixedly couples the first gearset component of the first planetary gearset to the second gearset component of the second planetary gearset and the third gearset component of the third planetary gearset; a third selective coupler which, when engaged, fixedly couples the third gearset component of the first planetary gearset to the at least one stationary member; a fourth selective coupler which, when engaged, fixedly couples the third gearset component of the second planetary gearset to the at least one stationary member: a fifth selective coupler which, when engaged, fixedly couples the third gearset component of the third planetary gearset to the at least one stationary member; a sixth selective coupler which, when engaged, fixedly couples the second gearset component of the third planetary gearset and the first gearset component of the fourth planetary gearset to the second gearset component of the fourth planetary gearset; and a seventh selective coupler which, when engaged, fixedly couples the third gearset component of the fourth planetary gearset to the at least one stationary member.

In an example thereof, each of the first planetary gearset, the second planetary gearset, the third planetary gearset, and the fourth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

In another example thereof, the at least one stationary member includes a housing, the housing having a first end and a second end, wherein the input member is accessible proximate the first end of the housing; the output member is accessible proximate the second end of the housing; the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the second end of the housing.

In a further example thereof, the plurality of selective couplers are selectively engaged in a plurality of combinations to establish at least ten forward speed ratios and at least one reverse speed ratio between the input member and the output member, each of the plurality of combinations having at least three of the plurality of selective couplers engaged.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 2 is a truth table illustrating the selective engagement of the seven selective couplers of FIG. 1 to provide ten forward gear or speed ratios and a reverse gear or speed ratio of the multi-speed transmission of FIG. 1.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION

Figure 1:
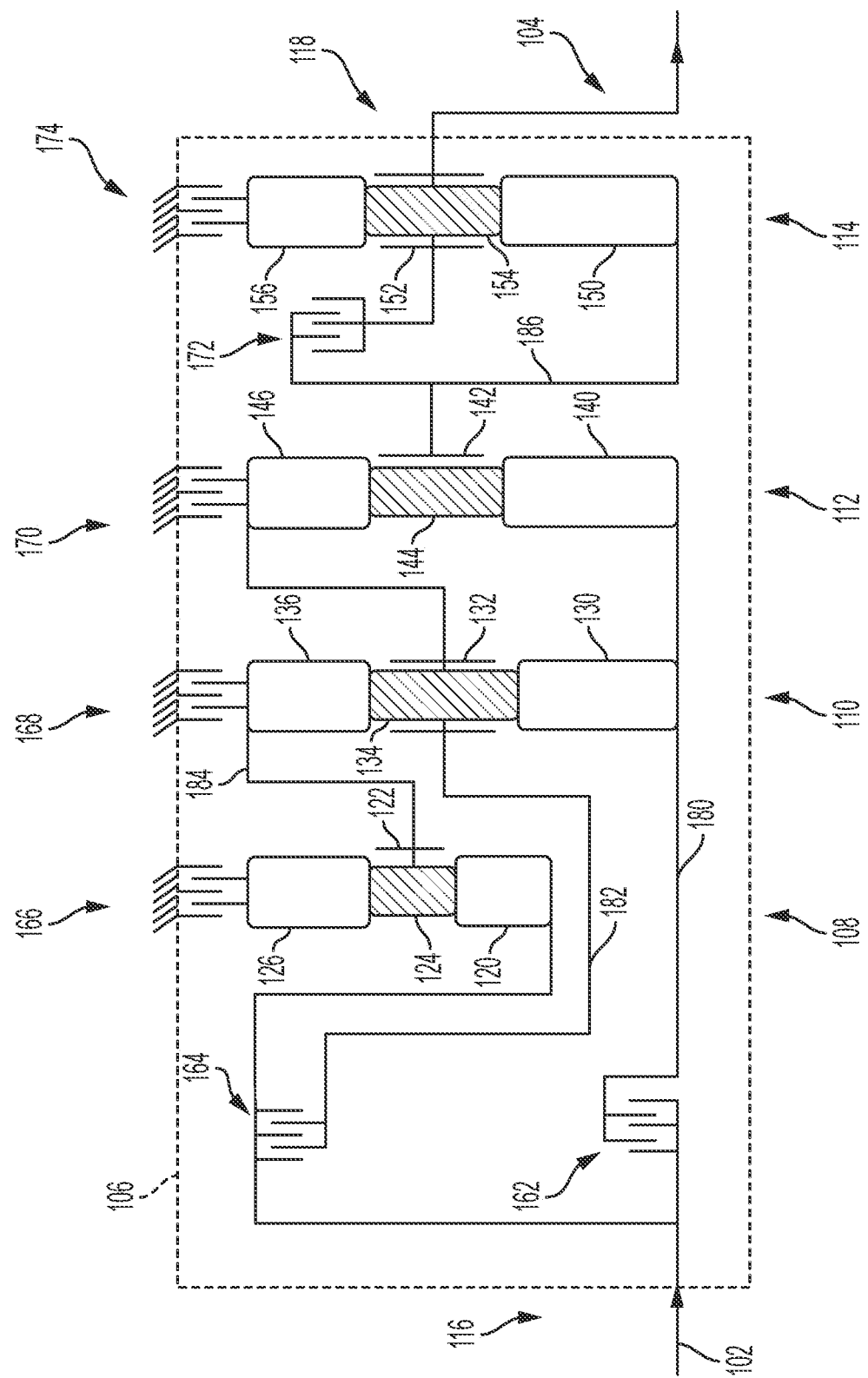
FIG. 1 is a diagrammatic view of an exemplary multi-speed transmission including four planetary gearsets and seven selective couplers.

For the purposes of promoting an understanding of the principles of the present disclosure, reference is now made to the embodiment illustrated in the drawings, which is described below. The embodiment disclosed below is not intended to be exhaustive or limit the present disclosure to the precise form disclosed in the following detailed description. Rather, the embodiment is chosen and described so that others skilled in the art may utilize its teachings. Therefore, no limitation of the scope of the present disclosure is thereby intended. Corresponding reference characters indicate corresponding parts throughout the several views.

In the disclosed transmission embodiment, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in the above-incorporated U.S. Pat. No. 9,625,007.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

The disclosed transmission embodiments include a plurality of planetary gearsets. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn intermeshed with the teeth of the ring gear. Each of these components may also be referred to as a gearset component. It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

One or more rotating components, such as shafts, drums, and other components, may be collectively referred to as an interconnector when the one or more components are fixedly coupled together. Interconnectors may further be fixedly coupled to one or more gearset components and/or one or more selective couplers.

An input member of the disclosed transmission embodiments is rotated by a prime mover. Exemplary prime movers include internal combustion engines, electric motors, hybrid power systems, and other suitable power systems. In one embodiment, the prime mover indirectly rotates the input member through a clutch and/or a torque converter. An output member of the disclosed transmission embodiments provides rotational power to one or more working components. Exemplary working components include one or more drive wheels of a motor vehicle, a power take-off shaft, and other suitable devices. The output member is rotated based on the interconnections of the gearset components and the selective couplers of the transmission. By changing the interconnections of the gearset components and the selective couplers, a rotation speed of the output member may be varied from a rotation speed of the input member.

The disclosed transmission embodiment is capable of transferring torque from the input member to the output member and rotating the output member in at least ten forward gear or speed ratios relative to the input member, illustratively ten forward gear or speed ratios, and one reverse gear or speed ratio wherein the rotation direction of the output member is reversed relative to its rotation direction for the at least ten forward ratios. The architecture disclosed herein may be utilized to achieve various gear ratios based on the characteristics of the gearsets utilized. Exemplary characteristics include respective gear diameters, the number of gear teeth, and the configurations of the various gears.

FIG. 1 is a diagrammatic representation of a multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. An exemplary output member 104 is an output shaft or other suitable rotatable component. An exemplary stationary member 106 is a housing of multi-speed transmission 100. The housing may include several components coupled together.

Multi-speed transmission 100 includes a plurality of planetary gearsets, illustratively a first planetary gearset 108, a second planetary gearset 110, a third planetary gearset 112, and a fourth planetary gearset 114. In one embodiment, additional planetary gearsets may be included. Further, although first planetary gearset 108, second planetary gearset 110, third planetary gearset 112, and fourth planetary gearset 114 are illustrated as simple planetary gearsets, it is contemplated that compound planetary gearsets may be included in some embodiments.

In one embodiment, multi-speed transmission 100 is arranged as illustrated in FIG. 1, with first planetary gearset 108 positioned between a first location or end 116 at which input member 102 enters stationary member 106 and second planetary gearset 110, second planetary gearset 110 is positioned between first planetary gearset 108 and third planetary gearset 112, third planetary gearset 112 is positioned between second planetary gearset 110 and fourth planetary gearset 114, and fourth planetary gearset 114 is positioned between third planetary gearset 112 and a second location or end 118 at which output member 104 exits stationary member 106. In alternative embodiments, first planetary gearset 108, second planetary gearset 110, third planetary gearset 112, and fourth planetary gearset 114 are arranged in any order relative to location 116 and location 118. In embodiments, each of first planetary gearset 108, second planetary gearset 110, third planetary gearset 112, and fourth planetary gearset 114 are axially aligned. In one example, input member 102 and output member 104 are also axially aligned with first planetary gearset 108, second planetary gearset 110, third planetary gearset 112, and fourth planetary gearset 114. In alternative embodiments, one or more of input member 102, output member 104, first planetary gearset 108, second planetary gearset 110, third planetary gearset 112, and fourth planetary gearset 114 are offset and not axially aligned with the remainder.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156.

Multi-speed transmission 100 further includes a plurality of selective couplers, illustratively a first selective coupler 162, a second selective coupler 164, a third selective coupler 166, a fourth selective coupler 168, a fifth selective coupler 170, a sixth selective coupler 172, and a seventh selective coupler 174. In the illustrated embodiment, first selective coupler 162, second selective coupler 164, and sixth selective coupler 172 are clutches and third selective coupler 166, fourth selective coupler 168, fifth selective coupler 170, and seventh selective coupler 174 are brakes. The axial locations of the clutches and brakes relative to the plurality of planetary gearsets may be altered from the illustrated axial locations.

Multi-speed transmission 100 includes several components that are illustratively shown as being fixedly coupled together. Input member 102 is fixedly coupled to sun gear 120 of first planetary gearset 108, first selective coupler 162, and second selective coupler 164. Output member 104 is fixedly coupled to planet carrier 152 of fourth planetary gearset 114 and to sixth selective coupler 172. Planet carrier 122 of first planetary gearset 108 is fixedly coupled to ring gear 136 of second planetary gearset 110. Sun gear 130 of second planetary gearset 110, sun gear 140 of third planetary gearset 112, and first selective coupler 162 are fixedly coupled together. Planet carrier 132 of second planetary gearset 110, ring gear 146 of third planetary gearset 112, and second selective coupler 164 are fixedly coupled together. Planet carrier 142 of third planetary gearset 112, sun gear 150 of fourth planetary gearset 114, and sixth selective coupler 172 are fixedly coupled together. In alternative embodiments, one or more of the components fixedly coupled together are selectively coupled together through one or more selective couplers.

Multi-speed transmission 100 may be described as having six interconnectors. Input member 102 is a first interconnector that both provides input torque to multi-speed transmission 100 and fixedly couples sun gear 120 of first planetary gearset 108, first selective coupler 162, and second selective coupler 164 together. Output member 104 is a second interconnector that both provides output torque from multi-speed transmission 100 and fixedly couples planet carrier 152 of fourth planetary gearset 114 to sixth selective coupler 172. A third interconnector 180 fixedly couples sun gear 130 of second planetary gearset 110 and sun gear 140 of third planetary gearset 112 to first selective coupler 162. A fourth interconnector 182 fixedly couples ring gear 146 of third planetary gearset 112, planet carrier 132 of second planetary gearset 110, and second selective coupler 164 together. A fifth interconnector 184 fixedly couples planet carrier 122 of first planetary gearset 108 to ring gear 136 of second planetary gearset 110. A sixth interconnector 186 fixedly couples sun gear 150 of fourth planetary gearset 114, planet carrier 142 of third planetary gearset 112, and sixth selective coupler 172 together.

Multi-speed transmission 100 further includes several components that are illustratively shown as being selectively coupled together through selective couplers. First selective coupler 162, when engaged, fixedly couples input member 102 and sun gear 120 of first planetary gearset 108 to sun gear 130 of second planetary gearset 110 and sun gear 140 of third planetary gearset 112. When first selective coupler 162 is disengaged, input member 102 and sun gear 120 of first planetary gearset 108 may rotate relative to sun gear 130 of second planetary gearset 110 and sun gear 140 of third planetary gearset 112.

Second selective coupler 164, when engaged, fixedly couples input member 102 and sun gear 120 of first planetary gearset 108 to planet carrier 132 of second planetary gearset 110 and ring gear 146 of third planetary gearset 112. When second selective coupler 164 is disengaged, input member 102 and sun gear 120 of first planetary gearset 108 may rotate relative to planet carrier 132 of second planetary gearset 110 and ring gear 146 of third planetary gearset 112.

Third selective coupler 166, when engaged, fixedly couples ring gear 126 of first planetary gearset 108 to stationary member 106. When third selective coupler 166 is disengaged, ring gear 126 of first planetary gearset 108 may rotate relative to stationary member 106.

Fourth selective coupler 168, when engaged, fixedly couples planet carrier 122 of first planetary gearset 108 and ring gear 136 of second planetary gearset 110 to stationary member 106. When fourth selective coupler 168 is disengaged, planet carrier 122 of first planetary gearset 108 and ring gear 136 of second planetary gearset 110 may rotate relative to stationary member 106.

Fifth selective coupler 170, when engaged, fixedly couples planet carrier 132 of second planetary gearset 110 and ring gear 146 of third planetary gearset 112 to stationary member 106. When fifth selective coupler 170 is disengaged, planet carrier 132 of second planetary gearset 110 and ring gear 146 of third planetary gearset 112 may rotate relative to stationary member 106.

Sixth selective coupler 172, when engaged, fixedly couples output member 104 and planet carrier 152 of fourth planetary gearset 114 to planet carrier 142 of third planetary gearset 112 and sun gear 150 of fourth planetary gearset 114. When sixth selective coupler 172 is engaged, sun gear 150 and planet carrier 152 of fourth planetary gearset 114 are locked together. Therefore, sun gear 150, planet carrier 152, and ring gear 156 of fourth planetary gearset 114 all rotate together as a single unit. The same effect may be realized by coupling any two of sun gear 150, planet carrier 152, and ring gear 156 of fourth planetary gearset 114 together. When sixth selective coupler 172 is disengaged, output member 104 and planet carrier 152 of fourth planetary gearset 114 may rotate relative to planet carrier 142 of third planetary gearset 112 and sun gear 150 of fourth planetary gearset 114.

Seventh selective coupler 174, when engaged, fixedly couples ring gear 156 of fourth planetary gearset 114 to stationary member 106. When seventh selective coupler 174 is disengaged, ring gear 156 of fourth planetary gearset 114 may rotate relative to stationary member 106.

By engaging various combinations of first selective coupler 162, second selective coupler 164, third selective coupler 166, fourth selective coupler 168, fifth selective coupler 170, sixth selective coupler 172, and seventh selective coupler 174 additional components of multi-speed transmission 100 may be fixedly coupled together.

The plurality of planetary gearsets and the plurality of selective couplers of multi-speed transmission 100 may be interconnected in various arrangements to provide torque from input member 102 to output member 104 in at least ten forward gear or speed ratios and one reverse gear or speed ratio. Referring to FIG. 2, an exemplary truth table 200 is shown that provides the state of each of first selective coupler 162, second selective coupler 164, third selective coupler 166, fourth selective coupler 168, fifth selective coupler 170, sixth selective coupler 172, and seventh selective coupler 174 for ten different forward gear or speed ratios and one reverse gear or speed ratio. Each row corresponds to a given interconnection arrangement for transmission 100. The first column provides the gear range ($1^{st}$-$10^{th}$ forward gears, neutral (N), and a reverse gear). The remaining columns illustrate which ones of the selective couplers 162-174 are engaged ("X" indicates engaged) and which ones of selective couplers 162-174 are disengaged ("(blank)" indicates disengaged). FIG. 2 is only one example of any number of truth tables possible for achieving at least ten forward ratios.

In the example of FIG. 2, the illustrated reverse ratio (Rev) is achieved by having third selective coupler 166, fifth selective coupler 170, and sixth selective coupler 172 in an engaged configuration and first selective coupler 162, second selective coupler 164, fourth selective coupler 168, and seventh selective coupler 174 in a disengaged configuration.

In one embodiment, to place multi-speed transmission 100 in neutral (N), all of first selective coupler 162, second selective coupler 164, third selective coupler 166, fourth selective coupler 168, fifth selective coupler 170, sixth selective coupler 172, and seventh selective coupler 174 are in the disengaged configuration. One or more of first selective coupler 162, second selective coupler 164, third selective coupler 166, fourth selective coupler 168, fifth selective coupler 170, sixth selective coupler 172, and seventh selective coupler 174 may remain engaged in neutral (N) as long as the combination of first selective coupler 162, second selective coupler 164, third selective coupler 166, fourth selective coupler 168, fifth selective coupler 170, sixth selective coupler 172, and seventh selective coupler 174 does not transmit torque from input member 102 to output member 104.

A first forward ratio (shown as 1st) in truth table 200 of FIG. 2 is achieved by having first selective coupler 162, fourth selective coupler 168, and seventh selective coupler 174 in an engaged configuration and second selective coupler 164, third selective coupler 166, fifth selective coupler 170, and sixth selective coupler 172 in a disengaged configuration.

A second or subsequent forward ratio (shown as 2nd) in truth table 200 of FIG. 2 is achieved by having first selective coupler 162, third selective coupler 166, and seventh selective coupler 174 in an engaged configuration and second selective coupler 164, fourth selective coupler 168, fifth selective coupler 170, and sixth selective coupler 172 in a disengaged configuration. Therefore, when transitioning between the first forward ratio and the second forward ratio, fourth selective coupler 168 is placed in the disengaged configuration and third selective coupler 166 is placed in the engaged configuration.

A third or subsequent forward ratio (shown as 3rd) in truth table 200 of FIG. 2 is achieved by having first selective coupler 162, second selective coupler 164, and seventh selective coupler 174 in an engaged configuration and third selective coupler 166, fourth selective coupler 168, fifth selective coupler 170, and sixth selective coupler 172 in a disengaged configuration. Therefore, when transitioning between the second forward ratio and the third forward ratio, third selective coupler 166 is placed in the disengaged configuration and second selective coupler 164 is placed in the engaged configuration.

A fourth or subsequent forward ratio (shown as 4th) in truth table 200 of FIG. 2 is achieved by having second selective coupler 164, third selective coupler 166, and seventh selective coupler 174 in an engaged configuration and first selective coupler 162, fourth selective coupler 168, fifth selective coupler 170, and sixth selective coupler 172 in a disengaged configuration. Therefore, when transitioning between the third forward ratio and the fourth forward ratio, first selective coupler 162 is placed in the disengaged configuration and third selective coupler 166 is placed in the engaged configuration.

A fifth or subsequent forward ratio (shown as 5th) in truth table 200 of FIG. 2 is achieved by having second selective coupler 164, fourth selective coupler 168, and seventh selective coupler 174 in an engaged configuration and first selective coupler 162, third selective coupler 166, fifth selective coupler 170, and sixth selective coupler 172 in a disengaged configuration. Therefore, when transitioning between the fourth forward ratio and the fifth forward ratio, third selective coupler 166 is placed in the disengaged configuration and fourth selective coupler 168 is placed in the engaged configuration.

A sixth or subsequent forward ratio (shown as 6th) in truth table 200 of FIG. 2 is achieved by having first selective coupler 162, fourth selective coupler 168, and sixth selective coupler 172 in an engaged configuration and second selective coupler 164, third selective coupler 166, fifth selective coupler 170, and seventh selective coupler 174 in a disengaged configuration. Therefore, when transitioning between the fifth forward ratio and the sixth forward ratio, second selective coupler 164 and seventh selective coupler 174 are placed in the disengaged configuration and first selective coupler 162 and sixth selective coupler 172 are placed in the engaged configuration.

A seventh or subsequent forward ratio (shown as 7th) in truth table 200 of FIG. 2 is achieved by having first selective coupler 162, third selective coupler 166, and sixth selective coupler 172 in an engaged configuration and second selective coupler 164, fourth selective coupler 168, fifth selective coupler 170, and seventh selective coupler 174 in a disengaged configuration. Therefore, when transitioning between the sixth forward ratio and the seventh forward ratio, fourth selective coupler 168 is placed in the disengaged configuration and third selective coupler 166 is placed in the engaged configuration.

An eighth or subsequent forward ratio (shown as 8th) in truth table 200 of FIG. 2 is achieved by having first selective coupler 162, second selective coupler 164, and sixth selective coupler 172 in an engaged configuration and third selective coupler 166, fourth selective coupler 168, fifth selective coupler 170, and seventh selective coupler 174 in a disengaged configuration. Therefore, when transitioning between the seventh forward ratio and the eighth forward ratio, third selective coupler 166 is placed in the disengaged configuration and second selective coupler 164 is placed in the engaged configuration.

A ninth or subsequent forward ratio (shown as 9th) in truth table 200 ofFIG. 2 is achieved by having second selective coupler 164, third selective coupler 166, and sixth selective coupler 172 in an engaged configuration and first selective coupler 162, fourth selective coupler 168, fifth selective coupler 170, and seventh selective coupler 174 in a disengaged configuration Therefore, when transitioning between the eighth forward ratio and the ninth forward ratio, first selective coupler 162 is placed in the disengaged configuration and third selective coupler 166 is placed in the engaged configuration.

A tenth or subsequent forward ratio (shown as 10th) in truth table 200 of FIG. 2 is achieved by having second selective coupler 164, fourth selective coupler 168, and sixth selective coupler 172 in an engaged configuration and first selective coupler 162, third selective coupler 166, fifth selective coupler 170, and seventh selective coupler 174 in a disengaged configuration. Therefore, when transitioning between the ninth forward ratio and the tenth forward ratio, third selective coupler 166 is placed in the disengaged configuration and fourth selective coupler 168 is placed in the engaged configuration.

The present disclosure contemplates that downshifts follow the reverse sequence of the corresponding upshift (as described above). Further, several power-on skip-shifts that are single-transition are possible (e.g. from $1^{st}$ up to $3^{rd}$, from $3^{rd}$ down to $1^{st}$, from $3^{rd}$, up to $5^{th}$, and from $5^{th}$ down to $3^{rd}$).

In the illustrated embodiments, various combinations of three of the available selective couplers are engaged for each of the illustrated forward speed ratios and reverse speed ratios. Additional forward speed ratios and reverse speed ratios are possible based on other combinations of engaged selective couplers. Although in the illustrated embodiments, each forward speed ratio and reverse speed ratio has three of the available selective couplers engaged, it is contemplated that less than three and more than three selective couplers may be engaged at the same time.

While this invention has been described as having exemplary designs, the present invention can be further modified within the spirit and scope of this disclosure. This application is therefore intended to cover any variations, uses, or adaptations of the invention using its general principles. Further, this application is intended to cover such departures fror the present disclosure as come within known or customary practice in the art to which this invention pertains and which fall within the limits of the appended claims.

What is claimed is:

1. A transmission comprising:
   at least one stationary member;
   an input member rotatable relative to the at least one stationary member;
   a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset, wherein a planet carrier of the third planetary gearset is fixedly coupled to a sun gear of the fourth planetary gearset;
   an output member operatively coupled to the input member through the plurality of planetary gearsets and rotatable relative to the at least one stationary member; and
   a plurality of selective couplers including a first number of clutches and a second number of brakes,
   wherein the output member is fixedly coupled to the fourth planetary gearset and the input member is:
   (i) fixedly coupled to the first planetary gearset;
   (ii) selectively coupled through a first clutch of the plurality of selective couplers, when engaged, to both the second planetary gearset and the third planetary gearset; and
   (iii) selectively coupled through a second clutch of the plurality of selective couplers, when engaged, to both the second planetary gearset and the third planetary gearset independent of the first clutch.

2. The transmission of claim 1, wherein the first clutch, when engaged, couples the input member to the first gearset component of the second planetary gearset and to the first gearset component of the third planetary gearset.

3. The transmission of claim 2, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is the sun gear of the fourth planetary gearset.

4. The transmission of claim 2, wherein the second clutch, when engaged, couples the input member to the second gearset component of the second planetary gearset and to the third gearset component of the third planetary gearset.

5. The transmission of claim 4, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is the sun gear of the fourth planetary gearset, the second gearset component of the first planetary gearset is a first planet carrier, the second gearset component of the second planetary gearset is a second planet carrier, the second gearset component of the third planetary gearset is the planet carrier of the third planetary gearset, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

6. The transmission of claim 1, wherein the second clutch, when engaged, couples the input member to the second gearset component of the second planetary gearset and to the third gearset component of the third planetary gearset.

7. The transmission of claim 6, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is the sun gear of the fourth planetary gearset, the second gearset component of the first planetary gearset is a first planet carrier, the second gearset component of the second planetary gearset is a second planet carrier, the second gearset component of the third planetary gearset is the planet carrier of the third planetary gearset, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

8. The transmission of claim 1, wherein the second number is greater than the first number.

9. The transmission of claim 8, wherein the second number is four and the first number is three.

10. The transmission of claim 1, wherein the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear, wherein
  a first brake of the plurality of selective couplers, when engaged, fixedly couples the first ring gear of the first planetary gearset to the at least one stationary member;
  a second brake of the plurality of selective couplers, when engaged, fixedly couples the second ring gear of the second planetary gearset to the at least one stationary member;
  a third brake of the plurality of selective couplers, when engaged, fixedly couples the third ring gear of the third planetary gearset to the at least one stationary member; and
  a fourth brake of the plurality of selective couplers, when engaged, fixedly couples the fourth ring gear of the fourth planetary gearset to the at least one stationary member.

11. The transmission of claim 1, wherein the input member is fixedly coupled to the first gearset component of the first planetary gearset.

12. The transmission of claim 11, wherein the output member is fixedly coupled to the second gearset component of the fourth planetary gearset.

13. The transmission of claim 1, further comprising
  a first interconnector which fixedly couples the second gearset component of the first planetary gearset and the third gearset component of the second planetary gearset together;
  a second interconnector fixedly couples the second gearset component of the second planetary gearset and the third gearset component of the third planetary gearset together; and
  a third interconnector which fixedly couples the first gearset component of the second planetary gearset and the first gearset component of the third planetary gearset together.

14. The transmission of claim 13, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is the sun gear of the fourth planetary gearset, the second gearset component of the first planetary gearset is a first planet carrier, the second gearset component of the second planetary gearset is a second planet carrier, the second gearset component of the third planetary gearset is the planet carrier of the third planetary gearset, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

15. The transmission of claim 1, wherein the plurality of selective couplers includes:
  a first selective coupler which, when engaged, fixedly couples the first gearset component of the first planetary gearset to the first gearset component of the second planetary gearset and the first gearset component of the third planetary gearset;
  a second selective coupler which, when engaged, fixedly couples the first gearset component of the first planetary gearset to the second gearset component of the second planetary gearset and the third gearset component of the third planetary gearset;
  a third selective coupler which, when engaged, fixedly couples the third gearset component of the first planetary gearset to the at least one stationary member;
  a fourth selective coupler which, when engaged, fixedly couples the third gearset component of the second planetary gearset to the at least one stationary member;
  a fifth selective coupler which, when engaged, fixedly couples the third gearset component of the third planetary gearset to the at least one stationary member;
  a sixth selective coupler which, when engaged, fixedly couples the second gearset component of the third planetary gearset and the first gearset component of the fourth planetary gearset to the second gearset component of the fourth planetary gearset; and
  a seventh selective coupler which, when engaged, fixedly couples the third gearset component of the fourth planetary gearset to the at least one stationary member.

16. The transmission of claim 15, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is the planet carrier of the third planetary gearset, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

17. The transmission of claim 1, wherein each of the first planetary gearset, the second planetary gearset, the third planetary gearset, and the fourth planetary gearset is a simple planetary gearset.

18. The transmission of claim 17, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is the sun gear of the fourth planetary gearset, the second gearset component of the first planetary gearset is a first planet carrier, the second gearset component of the second planetary gearset is a second planet carrier, the second gearset component of the third planetary gearset is the planet carrier of the third planetary gearset, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

19. The transmission of claim 1, wherein the at least one stationary member includes a housing, the housing having a first end and a second end, wherein
the input member is accessible proximate the first end of the housing;
the output member is accessible proximate the second end of the housing;
the first planetary gearset is positioned between the first end of the housing and the second planetary gearset;
the second planetary gearset is positioned between the first planetary gearset and the third planetary gearset;
the third planetary gearset is positioned between the second planetary gearset and the fourth planetary gearset; and
the fourth planetary gearset is positioned between the third planetary gearset and the second end of the housing.

20. The transmission of claim 1, wherein the plurality of selective couplers are selectively engaged in a plurality of combinations to establish at least ten forward speed ratios and at least one reverse speed ratio between the input member and the output member, each of the plurality of combinations having at least three of the plurality of selective couplers engaged.

21. A transmission comprising:
at least one stationary member;
an input member rotatable relative to the at least one stationary member;
a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset, the input member is fixedly coupled to the first gearset component of the first planetary gearset;
an output member operatively coupled to the input member through the plurality of planetary gearsets and rotatable relative to the at least one stationary member, the output member is fixedly coupled to the second gearset component of the fourth planetary gearset;
a first interconnector which fixedly couples the second gearset component of the first planetary gearset and the third gearset component of the second planetary gearset together;
a second interconnector fixedly couples the second gearset component of the second planetary gearset and the third gearset component of the third planetary gearset together;
a third interconnector which fixedly couples the first gearset component of the second planetary gearset and the first gearset component of the third planetary gearset together;
a fourth interconnector which fixedly couples the second gearset component of the third planetary gearset and the first gearset component of the fourth planetary gearset together; and
a plurality of selective couplers, wherein the plurality of selective couplers includes:
a first selective coupler which, when engaged, fixedly couples the first gearset component of the first planetary gearset to the first gearset component of the second planetary gearset and the first gearset component of the third planetary gearset;
a second selective coupler which, when engaged, fixedly couples the first gearset component of the first planetary gearset to the second gearset component of the second planetary gearset and the third gearset component of the third planetary gearset;
a third selective coupler which, when engaged, fixedly couples the third gearset component of the first planetary gearset to the at least one stationary member;
a fourth selective coupler which, when engaged, fixedly couples the third gearset component of the second planetary gearset to the at least one stationary member;
a fifth selective coupler which, when engaged, fixedly couples the third gearset component of the third planetary gearset to the at least one stationary member;
a sixth selective coupler which, when engaged, fixedly couples the second gearset component of the third planetary gearset and the first gearset component of the fourth planetary gearset to the second gearset component of the fourth planetary gearset; and
a seventh selective coupler which, when engaged, fixedly couples the third gearset component of the fourth planetary gearset to the at least one stationary member.

22. The transmission of claim 21, wherein each of the first planetary gearset, the second planetary gearset, the third planetary gearset, and the fourth planetary gearset is a simple planetary gearset.

23. The transmission of claim 22, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

24. The transmission of claim 21, wherein the at least one stationary member includes a housing, the housing having a first end and a second end, wherein
the input member is accessible proximate the first end of the housing;
the output member is accessible proximate the second end of the housing;

the first planetary gearset is positioned between the first end of the housing and the second planetary gearset;

the second planetary gearset is positioned between the first planetary gearset and the third planetary gearset;

the third planetary gearset is positioned between the second planetary gearset and the fourth planetary gearset; and the fourth planetary gearset is positioned between the third planetary gearset and the second end of the housing.

25. The transmission of claim 21, wherein the plurality of selective couplers are selectively engaged in a plurality of combinations to establish at least ten forward speed ratios and at least one reverse speed ratio between the input member and the output member, each of the plurality of combinations having at least three of the plurality of selective couplers engaged.

26. A transmission comprising:

at least one stationary member;

an input member rotatable relative to the at least one stationary member;

a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset;

an output member operatively coupled to the input member through the plurality of planetary gearsets and rotatable relative to the at least one stationary member; and a plurality of selective couplers including a first number of clutches and a second number of brakes, wherein the plurality of selective couplers includes a first selective coupler which, when engaged, fixedly couples the first gearset component of the first planetary gearset to the first gearset component of the second planetary gearset and the first gearset component of the third planetary gearset;

a second selective coupler which, when engaged, fixedly couples the first gearset component of the first planetary gearset to the second gearset component of the second planetary gearset and the third gearset component of the third planetary gearset;

a third selective coupler which, when engaged, fixedly couples the third gearset component of the first planetary gearset to the at least one stationary member;

a fourth selective coupler which, when engaged, fixedly couples the third gearset component of the second planetary gearset to the at least one stationary member;

a fifth selective coupler which, when engaged, fixedly couples the third gearset component of the third planetary gearset to the at least one stationary member;

a sixth selective coupler which, when engaged, fixedly couples the second gearset component of the third planetary gearset and the first gearset component of the fourth planetary gearset to the second gearset component of the fourth planetary gearset; and a seventh selective coupler which, when engaged, fixedly couples the third gearset component of the fourth planetary gearset to the at least one stationary member; and wherein the output member is fixedly coupled to the fourth planetary gearset and the input member is:

(i) fixedly coupled to the first planetary gearset;

(ii) selectively coupled through a first clutch of the plurality of selective couplers, when engaged, to both the second planetary gearset and the third planetary gearset and (iii) selectively coupled through a second clutch of the plurality of selective couplers, when engaged, to both the second planetary gearset and the third planetary gearset independent of the first clutch.

27. The transmission of claim 26, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

* * * * *